(12) United States Patent
Golembeski, Jr.

(10) Patent No.: US 9,015,512 B2
(45) Date of Patent: Apr. 21, 2015

(54) ACCESSORY AND HOST BATTERY SYNCHRONIZATION

(75) Inventor: Gregg J. Golembeski, Jr., San Francisco, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 13/278,677

(22) Filed: Oct. 21, 2011

(65) Prior Publication Data

US 2013/0103965 A1    Apr. 25, 2013

(51) Int. Cl.
| | |
|---|---|
| *G06F 1/00* | (2006.01) |
| *G06F 1/26* | (2006.01) |
| *G06F 1/32* | (2006.01) |
| *H02J 7/00* | (2006.01) |

(52) U.S. Cl.
CPC ........ *G06F 1/26* (2013.01); *G06F 1/266* (2013.01); *G06F 1/3212* (2013.01)

(58) Field of Classification Search
CPC ..... Y02E 60/12; Y02E 60/122; H02J 7/0004; H02J 7/0008; H02J 7/0044; H02J 4/0077; H02J 7/0054; G06F 1/3206; G06F 1/3212
USPC .................. 320/103, 137; 713/340
See application file for complete search history.

(56) References Cited

U.S. PATENT DOCUMENTS

| | | | | |
|---|---|---|---|---|
| 5,870,615 | A * | 2/1999 | Bar-On et al. ............. | 713/310 |
| 6,433,512 | B1 * | 8/2002 | Birkler et al. ............. | 320/132 |
| 6,531,845 | B2 * | 3/2003 | Kerai et al. ............. | 320/107 |
| 6,653,813 | B2 * | 11/2003 | Khatri ............. | 320/103 |
| 6,820,206 | B1 * | 11/2004 | Kim et al. ............. | 713/300 |
| 6,928,310 | B2 * | 8/2005 | Lee ............. | 455/572 |
| 7,158,815 | B2 * | 1/2007 | Roh ............. | 455/573 |
| 7,278,877 | B2 * | 10/2007 | Cho ............. | 439/502 |
| 7,508,162 | B2 * | 3/2009 | Lippojoki et al. ............. | 320/103 |
| 7,558,894 | B1 * | 7/2009 | Lydon et al. ............. | 710/105 |
| 7,574,177 | B2 * | 8/2009 | Tupman et al. ............. | 455/90.3 |
| 7,584,376 | B2 * | 9/2009 | Finkelstein et al. ............. | 713/324 |
| 7,792,290 | B2 * | 9/2010 | Adams et al. ............. | 380/44 |
| 7,863,856 | B2 * | 1/2011 | Sherman et al. ............. | 320/103 |
| 7,863,862 | B2 * | 1/2011 | Idzik et al. ............. | 320/114 |
| 7,911,530 | B2 * | 3/2011 | Sawachi ............. | 348/372 |
| 7,915,855 | B2 * | 3/2011 | Yoon et al. ............. | 320/103 |
| 8,030,800 | B1 * | 10/2011 | Terrell et al. ............. | 307/64 |
| 8,156,363 | B2 * | 4/2012 | Kobayashi et al. ............. | 713/340 |
| 8,170,523 | B2 * | 5/2012 | Kang et al. ............. | 455/336 |
| 8,224,596 | B2 * | 7/2012 | Agrawal et al. ............. | 702/63 |

(Continued)

*Primary Examiner* — Brian Misiura
(74) *Attorney, Agent, or Firm* — Park, Vaughan, Fleming & Dowler LLP; Steven E. Stupp

(57) ABSTRACT

A portable electronic device that can receive power from an internal power source (such as a battery) and/or a second portable electronic device is described. In order to coordinate the power availability in these portable electronic devices, a power-management mechanism in the portable electronic device (which may be implemented in hardware and/or software) may determine a power state of an internal power source in the second portable electronic device, and may accordingly adjust a power consumption by circuits in the portable electronic device and/or the power received from the second portable electronic device. In this way, the power-management mechanism may approximately synchronize the power consumption in the portable electronic devices and/or the power states of the internal power sources in the portable electronic devices. This approximate synchronization may facilitate concurrent operation of the portable electronic devices.

23 Claims, 5 Drawing Sheets

(56) References Cited

U.S. PATENT DOCUMENTS

| | | | |
|---|---|---|---|
| 8,269,453 B2* | 9/2012 | Ludtke | 320/106 |
| 8,271,806 B1* | 9/2012 | Xiao et al. | 713/300 |
| 8,386,826 B2* | 2/2013 | Newman | 713/340 |
| 8,438,408 B2* | 5/2013 | Louboutin et al. | 713/320 |
| 8,898,485 B2* | 11/2014 | Scott et al. | 713/300 |
| 2011/0016333 A1* | 1/2011 | Scott et al. | 713/300 |
| 2011/0181235 A1* | 7/2011 | Walley et al. | 320/103 |
| 2012/0137041 A1* | 5/2012 | Chen | 710/313 |
| 2013/0127687 A1* | 5/2013 | Yu | 345/1.1 |

* cited by examiner

ACCESSORY AND HOST BATTERY SYNCHRONIZATION

BACKGROUND

1. Field

The present disclosure relates to power management for electronic devices which are coupled together. More specifically, the present disclosure relates to coordination of power sources between a host device and an accessory device.

2. Related Art

The capabilities offered by a portable electronic device may be expanded by coupling it to another portable electronic device. For example, a host device, such as a cellular telephone, may be coupled to an accessory device, such as a credit-card reader, and the combination of the two may allow payment using a credit or debit card at an arbitrary location.

However, in this configuration the power usage of the host device and the accessory device are not coordinated. Because each of these devices has a separate power source (such as a battery) with a different amount of available power, in general the operating life of the host device and the accessory device are likely to be different. As a consequence, one of the devices may run out of power before the other, in which case the additional capabilities offered by the combination of the host device and the accessory device will no longer be available.

Hence, what is needed is a technique for coordinating the power sources in the host device and the accessory device that overcomes the problems listed above.

SUMMARY

One embodiment of the present disclosure relates to a portable electronic device that can receive power from an internal power source (such as a battery) and/or a second portable electronic device. In order to coordinate the power availability in these portable electronic devices, a power-management mechanism in the portable electronic device (which may be implemented in hardware and/or software) may determine a power state of an internal power source in the second portable electronic device, and may accordingly adjust a power consumption by circuits in the portable electronic device and/or the power received from the second portable electronic device. In this way, the power-management mechanism may approximately synchronize the power consumption in the portable electronic devices and/or the power states of the internal power sources in the portable electronic devices. This approximate synchronization may facilitate concurrent operation of the portable electronic devices.

Similarly, the portable electronic device may provide power to the second portable electronic device. In this case, the power-management mechanism may determine power consumption by circuits in the second portable electronic device, and may adjust this power consumption based on the power states of the portable electronic devices.

Another embodiment provides a method for performing power management that includes at least some of the operations performed by and/or functions of the portable electronic device.

Another embodiment provides a computer-program product for use with the portable electronic device. This computer-program product includes instructions for at least some of the operations performed by and/or functions of the portable electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
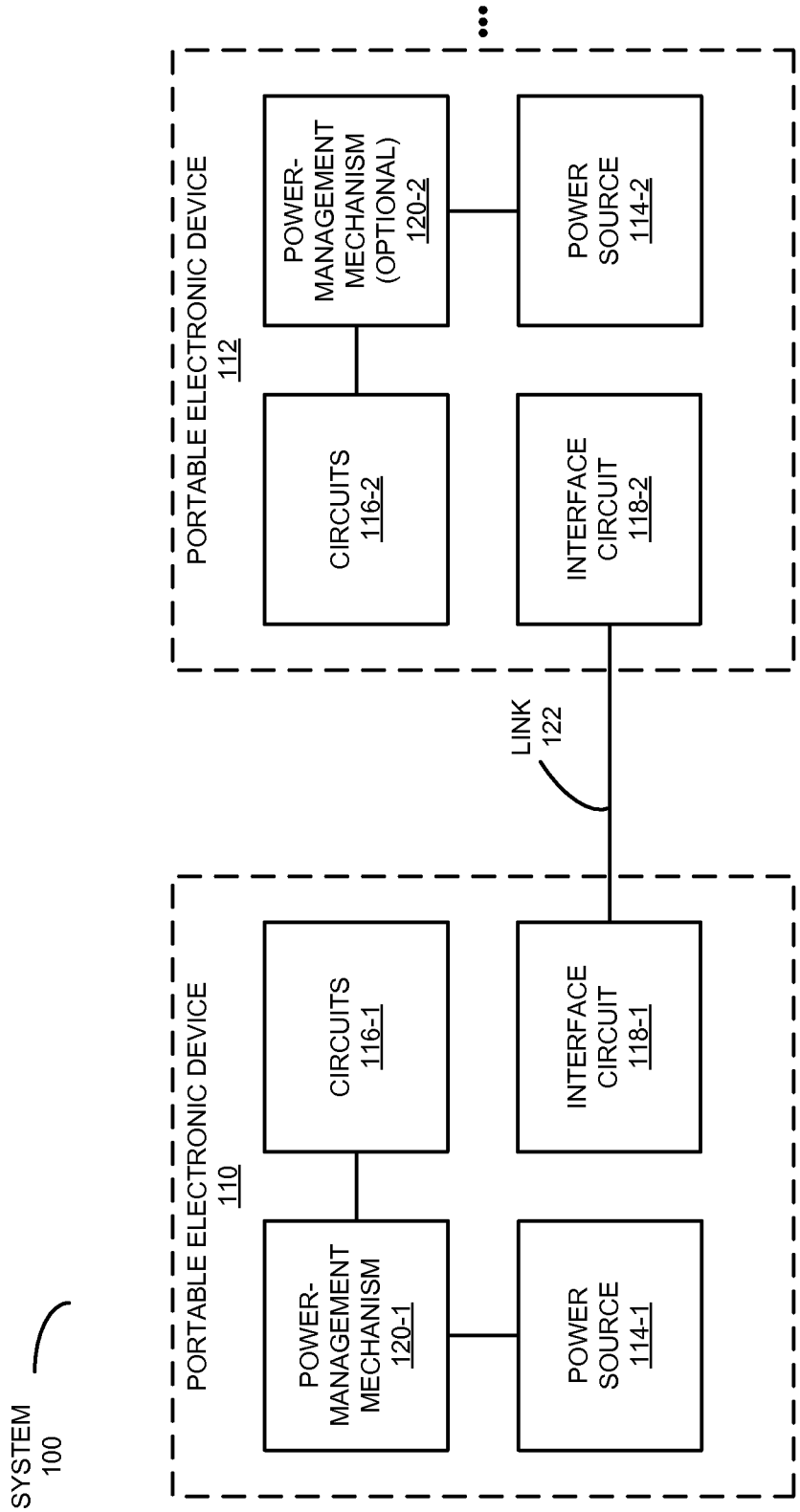
FIG. 1 is a block diagram illustrating a system that includes at least two coupled portable electronic devices in accordance with an embodiment of the present disclosure.

FIG. 1 presents a block diagram illustrating a system 100 that includes at least two coupled portable electronic devices 110 and 112. While these portable electronic devices may or may not be instances of the same electronic device, each may include: a power source (such as power source 114-1) that supplies power to circuits (such as circuits 116-1); an interface circuit (such as interface circuit 118-1); and a power-management mechanism (such as power-management mechanism 120-1) that monitors a power state of the power source and manages power consumption by the circuits. For example, power-management mechanism 120-1 may monitor the power state of power source 114-1 (such as the available power and/or the rate of change in the available power or the power consumption) and may manage power consumption by circuits 116-1 (such as by turning one or more of circuits 116-1 into a 'standby' operating mode). Furthermore, portable electronic devices 110 and 112 may be coupled to each other so that portable electronic device 110 can receive power from portable electronic device 112. Thus, interface circuits 118 may be electrically AC or DC-coupled by link 122 (such as a Universal Serial Bus or USB).

In existing power-management techniques, portable electronic device 112 provides limited power-state information, via link 122, to portable electronic device 110 about the amount of power that portable electronic device 110 can draw from portable electronic device 112 and when power source 114-2 is empty. However, because the power-state information is limited and, in general, power sources 114 (such as batteries) are different, power-state mismatches between power sources 114 can result. For example, the available amount of charge on power source 114-2 may be very different than that on power source 114-1, and the power consumption in portable electronic device 112 may be much larger than the power consumption in portable electronic device 110. As a consequence, portable electronic device 112 may cease functioning before portable electronic device 110. This can be a problem, especially in applications where the combination of portable electronic devices 110 and 112 is used to provide particular capabilities.

Figure 2:
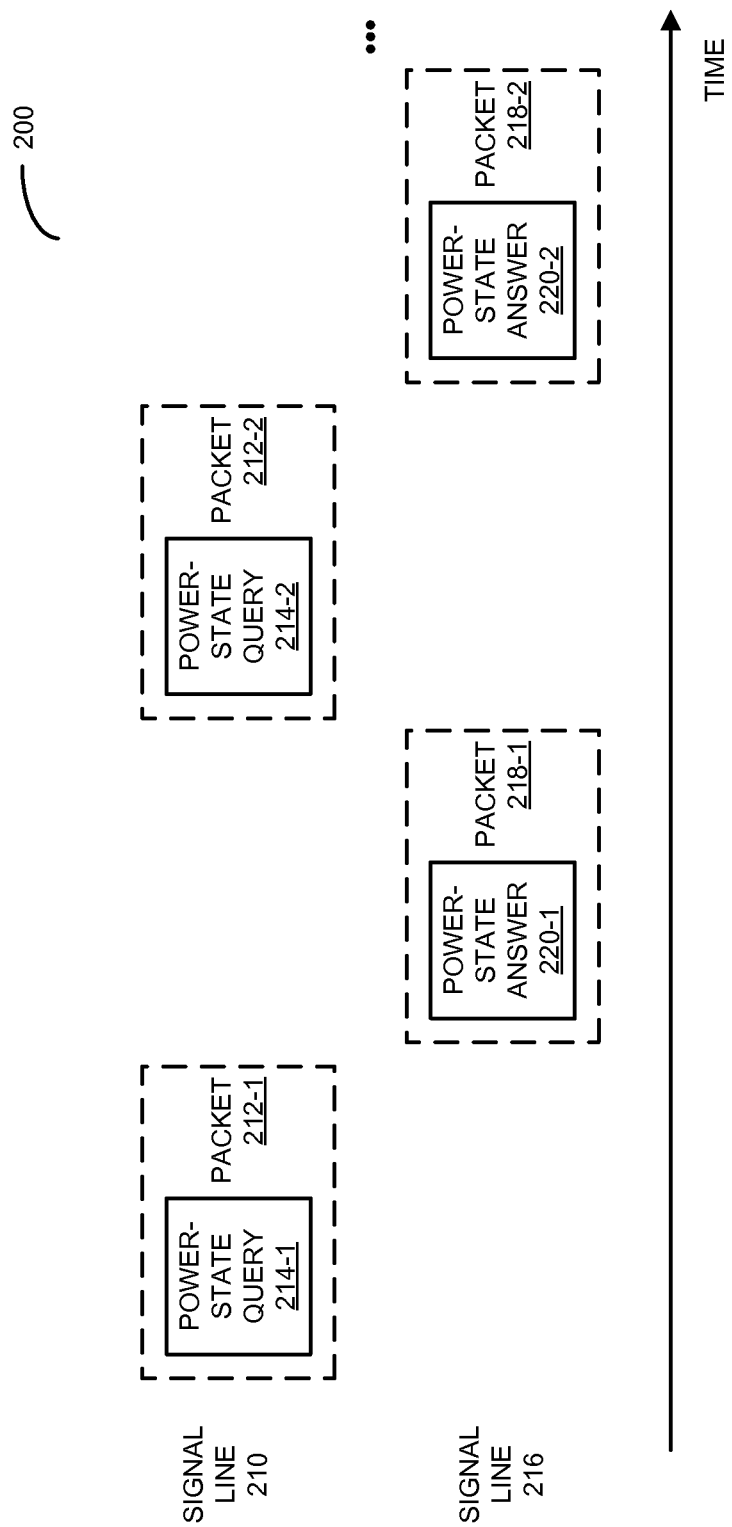
FIG. 2 is a timing diagram that illustrates power-state queries and power-state answers communicated on a link between the portable electronic devices in the system of FIG. 1 in accordance with an embodiment of the present disclosure.

To address this problem, power-management mechanism 120-1 may determine the power state of power source 114-2 in portable electronic device 112 (such as the available power and/or the rate of change in the available power or the power consumption), and may adjust the power consumption by circuits 116-1 and/or the power received from portable electronic device 112 based on the power states of portable electronic devices 110 and 112. In general, information about the power state of power source 114-2 may be conveyed or communicated via interface circuits 118 and link 122 using a wide variety of communication techniques that may be implemented in hardware and/or software. For example, the power state of power source 114-2 may be indicated by an electrical signal (such as voltage on a signal line) that is provided by power-management mechanism 120-2. Alternatively or additionally, as illustrated in FIG. 2, which presents a timing diagram 200 of communication on link 122 (FIG. 1), power-management mechanism 120-1 (FIG. 1) may determine the power state of power source 114-2 (FIG. 1) by communicating a series of power-state queries 214 to portable electronic device 112 (FIG. 1) via packets 212 on a signal line 210 in link 122 (FIG. 1), and receiving power-state answers 220 to the corresponding power-state queries 214 from portable electronic device 112 (FIG. 1) via packets 218 on a signal line 216 in link 122 (FIG. 1).

Referring back to FIG. 1, by providing more detailed power-situational awareness of at least the power state of portable electronic device 112, power-management mechanism 120-1 may approximately synchronize the power state, the power consumption and/or the availability of portable electronic devices 110 and 112. For example, power-management mechanism 120-1 may ensure that the power states in portable electronic devices 110 and 112 are approximately the same (such as within 1, 5 or 10% of each other), so that portable electronic devices 110 and 112 have approximately the same operating battery life. Therefore, this power-management technique may allow coordinated or concurrent operation of portable electronic devices 110 and 112.

While the preceding example illustrated unidirectional power flow from portable electronic device 112 to portable electronic device 110, in other embodiments portable electronic device 110 can, as needed, provide power to portable electronic device 112. For example, power-management mechanism 120-1 may determine that portable electronic device 110 should provide power to portable electronic device 112 via interface circuits 118 and link 122 based on the power states of portable electronic devices 110 and 112. Furthermore, in some embodiments power-management mechanism 120-1 determines the power consumption of circuits 116-2 in portable electronic device 112 and adjusts this power consumption based on the power states of portable electronic devices 110 and 112. Therefore, in some embodiments power-management mechanism 120-1 may function as a master power-management mechanism for portable electronic device 112. In these embodiments, portable electronic device 112 may or may not include power-management mechanism 120-2 (i.e., this power-management mechanism may be optional).

In an exemplary embodiment, portable electronic device 110 is an iPod™ (from Apple, Inc. of Cupertino, Calif.) and portable electronic device 112 is a credit- or debit-card reader (which includes a battery pack). The iPod™ may determine the power state of the credit- or debit-card reader via one or more voltage flags set on a USB line that couples these devices. Alternatively, in embodiments where the credit- or debit-card reader does not include a power-management mechanism (such as a power regulator) the power state of the credit- or debit-card reader may be determined by the iPod™ by analyzing the credit- or debit-card reader as a Thevinin-equivalent circuit. Furthermore, in some embodiments power-state information is conveyed from the credit- or debit-card reader to the iPod™ using an iPod™ accessories protocol. Note that communication between the iPod™ and the credit- or debit-card reader may be unidirectional or bidirectional and/or may be asynchronous or synchronous (such as periodic reports of the power state of the credit or debit-card reader).

For example, using the iPod™ accessories protocol, a data packet that includes a query about the power state of the credit- or debit-card reader (such as the remaining charge in a battery or the battery level) may be provided by the iPod™. In response, the credit- or debit-card reader may provide a data packet to the iPod™ that includes the answer. This power-state information may be used by power-management mechanism 120-1 to concurrently set the power states of the iPod™ and the credit or debit-card reader, such as: one portable electronic device has a higher power consumption than the other, the portable electronic devices have approximately the same power consumption, the available power in power sources 114 is approximately the same, etc. In this way, the power-management technique may be used to ensure that the iPod™ and the credit- or debit-card reader can work as a unit and/or that their power states can be approximately synchronized (which, during use, may ensure that the available power in their batteries is approximately the same and/or decreases at approximately the same rate).

In another exemplary embodiment, portable electronic device 110 is an iPhone™ (from Apple, Inc. of Cupertino, Calif.) and portable electronic device 112 includes a global-positioning-system antenna that facilitates the use of applications offering location-based services on the iPhone™ at remote locations. By synchronizing these two portable electronic devices, the power-management technique may allow a user to leverage the capabilities provided by the combination (for example, to go trail running in a forest) with the assurance that one of the two portable electronic devices won't run out of power before the other.

Figure 3:
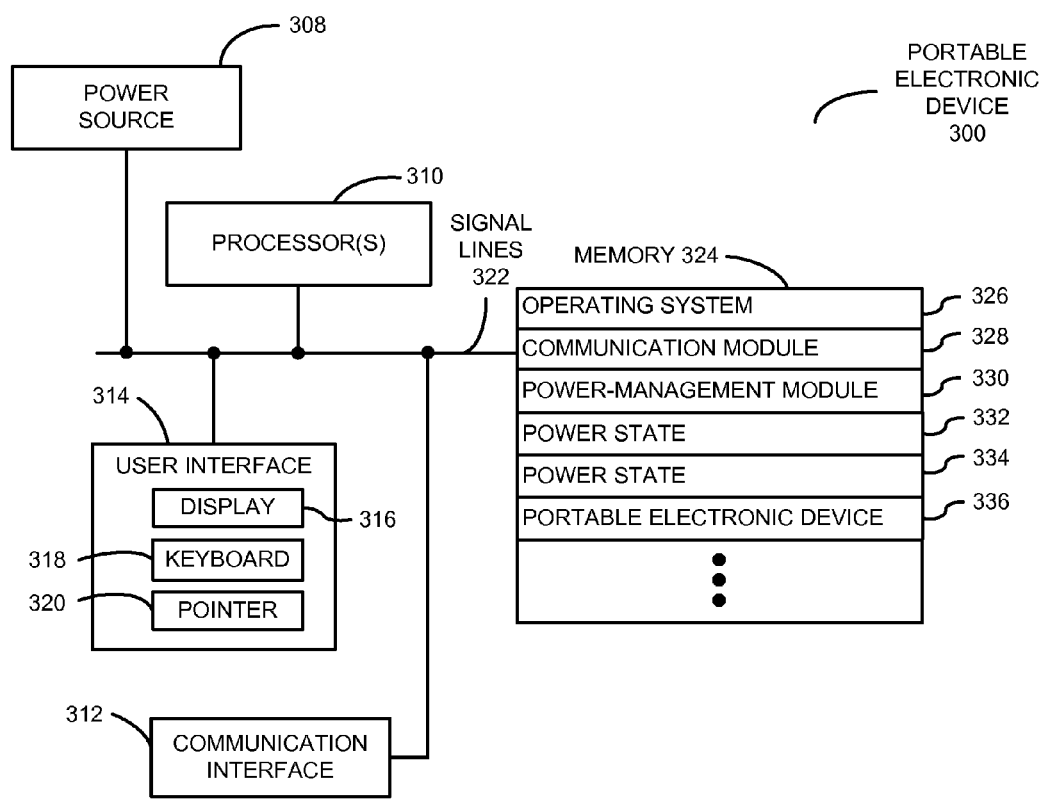
FIG. 3 is a block diagram illustrating a portable electronic device in the system of FIG. 1 in accordance with an embodiment of the present disclosure.

The power-management technique may be implemented in hardware (for example, power-management mechanism 120-1 may be implemented using control logic) and/or software. FIG. 3 presents a block diagram of a portable electronic device 300 in system 100 (FIG. 1). This portable electronic device includes: one or more processors 310 (or processor cores or elements and, more generally, a means for computing), communication interface 312 (which may include interface circuit 118-1 in FIG. 1), a user interface 314, and one or more signal lines 322 coupling these components together. Note that the one or more processors 310 may support parallel processing and/or multi-threaded operation, communication interface 312 may have a persistent communication connection, and the one or more signal lines 322 may constitute a communication link or a communication bus. Moreover, the user interface 314 may include: a display 316, a keyboard 318, and/or a pointer 320, such as a mouse.

In this discussion, a portable electronic device includes one or more electronic devices that are capable of manipulating computer-readable data or communicating such data between two or more electronic devices over a network, including: a personal computer, a laptop computer, a mainframe computer, a computer system, a server, a work station, a portable computing device (such as a cellular phone or personal digital assistant that a user can readily carry or move from one location to the next), a personal organizer, a client computer (in a client-server architecture), a digital signal processor, a game console, an MP3 player, a tablet computer, a device controller, and/or a computational engine within an appliance. Furthermore, a 'keyboard' includes a user interface device (or, more generally, an input device) with physical or virtual keys (such as on a touch-sensitive display) that a user can activate by moving one or more digits to provide alpha-numeric information. Additionally, a 'mouse' includes a user interface device (or, more generally, an input device) that a user can move or manipulate (for example, by moving their hand or by clicking on a button) to move a cursor (or, more generally, an icon on a display where characters can be entered, corrected or deleted) or to select an object (such as displayed text). Note that a 'display' may include a wide variety of devices that can present information or receive user instructions, including: a cathode ray tube, a liquid-crystal display, a light-emitting-diode display, a projection display, a touch-sensitive display (or touch screen), a flexible display (such as a polymer display), an organic light-emitting-diode display, an electronic-ink display, etc.

Memory 324 in the portable electronic device 300 may include volatile memory and/or non-volatile memory that are configured to store information. More specifically, memory 324 may include: ROM, RAM, EPROM, EEPROM, flash memory, one or more smart cards, one or more magnetic disc storage devices, magnetic tape, one or more optical storage devices, and/or other media capable of storing code and/or data now known or later developed. Memory 324 may store an operating system 326 that includes procedures (or a set of instructions) for handling various basic system services for performing hardware-dependent tasks. While not explicitly indicated in portable electronic device 300, in some embodiments operating system 326 includes a web browser, such as: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.). Additionally, memory 324 may store procedures (or a set of instructions) in a communication module 328. These communication procedures may be used for communicating with one or more portable electronic devices and/or non-portable electronic devices (including electronic devices, such as computers or computer systems, which are remotely located with respect to portable electronic device 300).

Memory 324 may also include multiple program modules (or sets of instructions), including power-management module 330. Note that one or more of these program modules (or sets of instructions) may constitute a computer-program mechanism.

During operation, power-management module 330 may perform at least a portion of the functionality of power-management mechanism 120-1 (FIG. 1). In particular, power-management module 330 may monitor a power state 332 of power source 308, such as the available power and/or the rate of change in the available power (i.e., the power consumption), and may manage power consumption by circuits in portable electronic device 300. In addition, power-management module 330 may determine power state 334 of a power source in a portable electronic device 336 that is coupled to portable electronic device 300 via communication interface 312, and which provides power to portable electronic device 300. For example, power-management module 330 may determine power state 334 by communicating a power-state query to the portable electronic device 336 and receiving an answer that includes power-state information.

Figure 4:
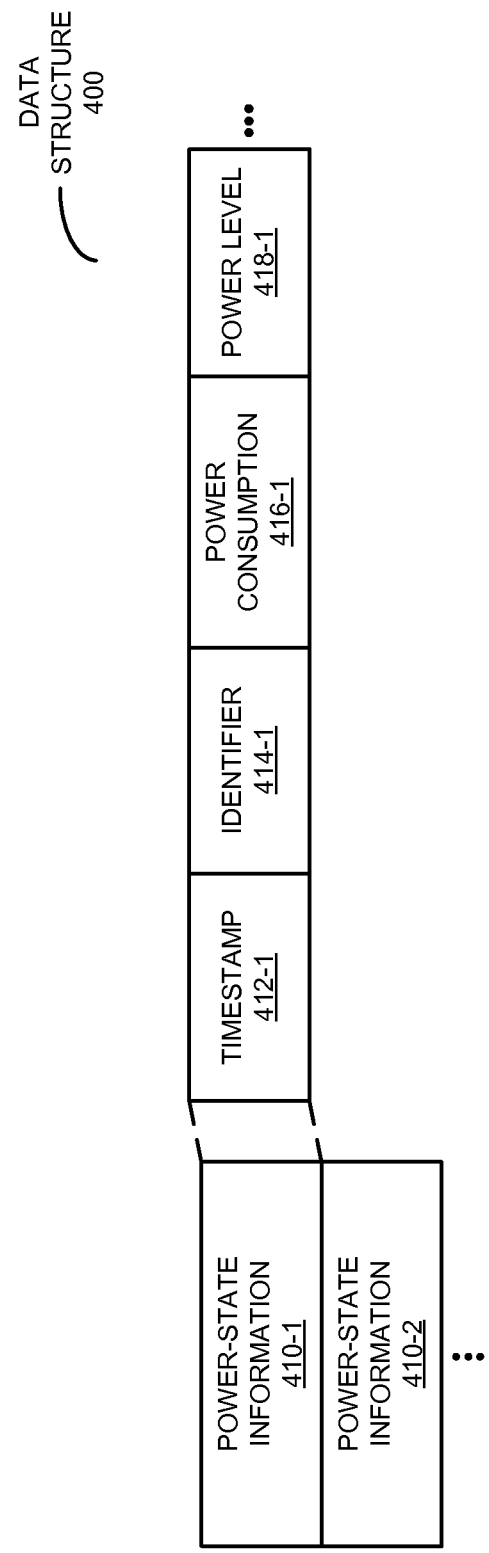
FIG. 4 is a block diagram illustrating a data structure for use in the portable electronic device of FIG. 3 in accordance with an embodiment of the present disclosure.

FIG. 4 presents a block diagram illustrating a data structure 400 for use in portable electronic device 300 (FIG. 3). This data structure may include power-state information 410 for one or more portable electronic devices. For example, power-state information 410-1 may include: a timestamp 412-1, an identifier 414-1 for another portable electronic device, power consumption 416-1 in the other portable electronic device, and/or a power level 418-1 of a power source in the other portable electronic device.

Referring back to FIG. 3, based on power states 332 and 334 power-management module 330 may adjust the power consumption by circuits in portable electronic device 300 and/or the power received from the portable electronic device 336. In this way, power-management module 330 may approximately synchronize power states 332 and 334, so that portable electronic device 300 and portable electronic device 336 have approximately the same power consumption and available power from internal power sources (such as power source 308). This approximate synchronization may facilitate concurrent availability and/or coordinated use of portable electronic devices 300 and 336.

In some embodiments, portable electronic device 300 may also selectively provide power to portable electronic device 336. For example, power-management module 330 may determine that portable electronic device 300 should provide power to portable electronic device 336 based on power states 332 and 334. This may ensure the concurrent availability of portable electronic devices 300 and 336. Additionally, in some embodiments power-management module 330 determines the power consumption of circuits in portable electronic device 336 and adjusts this power consumption based on power states 332 and 334.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although portable electronic device 300 is illustrated as having a number of discrete components, FIG. 3 is intended to be a functional description of the various features that may be present in portable electronic device 300 rather than a structural schematic of the embodiments described herein. In practice, and as recognized by those of ordinary skill in the art, the functions of portable electronic device 300 may be distributed over a large number of servers or computers, with various groups of the servers or computers performing particular subsets of the functions. For example, portable electronic device 300 may include a cloud computing system or a client-server computing system.

Furthermore, in some embodiments system 100 (FIG. 1), portable electronic device 300 and/or data structure 400 (FIG. 4) include fewer or additional components. For example, while FIG. 1 illustrates the synchronization of the power states of portable devices 110 and 112, in other embodiments the power state of portable electronic device 110 is synchronized with the power states of multiple portable electronic devices to which it is coupled. Moreover, two or more components may be combined into a single component and/or a position of one or more components may be changed. Note that in some embodiments the functionality of portable electronic device 300 may be implemented more in hardware and less in software, or less in hardware and more in software, as is known in the art. In some embodiments, some or all of the functionality of portable electronic device 300 is implemented in one or more application-specific integrated circuits (ASICs) and/or one or more digital signal processors (DSPs).

Figure 5:
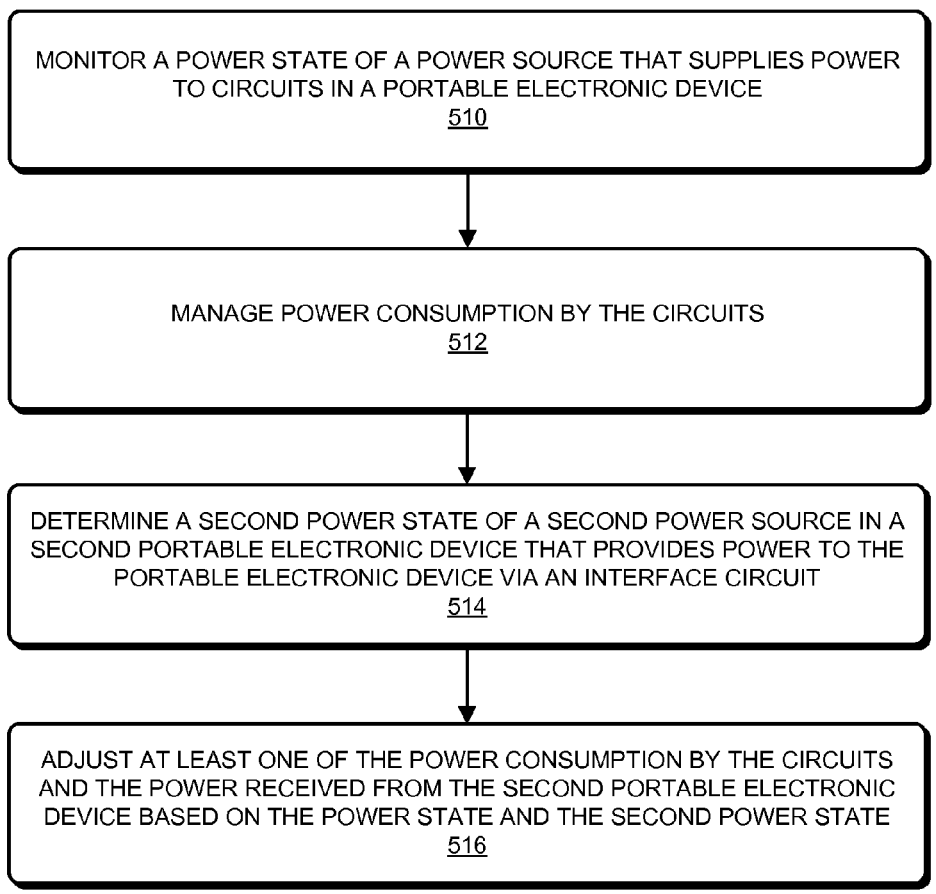
FIG. 5 is a flow diagram of a method for performing power management in accordance with an embodiment of the present disclosure.

We now describe embodiments of a power-management technique. FIG. 5 presents a flow diagram of a method 500 for performing power management, which may be performed by a portable electronic device, such as portable electronic device 300 (FIG. 3). During operation, the portable electronic device monitors a power state of a power source in the portable electronic device that supplies power to circuits in the portable electronic device (operation 510). Then, the portable electronic device manages power consumption by the circuits (operation 512). Moreover, the portable electronic device determines a second power state of a second power source in a second portable electronic device (such as an accessory) that provides power to the portable electronic device via an interface circuit (operation 514). Next, the portable electronic device adjusts at least one of the power consumption by the circuits and the power received from the second portable electronic device based on the power state and the second power state (operation 516).

In an exemplary embodiment of method 500, the portable electronic device periodically receives information that specifies a current power level of a power source in the accessory. Then, the portable electronic device determines its current power level. Moreover, the portable electronic device determines when and how much charging to request from the accessory such that the accessory and the portable device lose power or cease operating at approximately the same time. Thus, the power-management technique may allow the portable electronic device to intelligently request charging by the accessory.

In some embodiments of method 500, there may be additional or fewer operations. Moreover, the order of the operations may be changed and/or two or more operations may be combined into a single operation.

While the preceding examples illustrate the use of the power-management technique with portable electronic devices, in other embodiments at least one of the portable electronic devices may be a non-portable electronic device (such as a personal computer).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A first portable electronic device, comprising:
   a first power source configured to supply power to circuits in the first portable electronic device;
   an interface circuit configured to communicate with and receive power from a second portable electronic device; and
   a power-management mechanism configured to:
   monitor a power state of the first power source;
   manage power consumption by the circuits in the first portable electronic device;
   determine, via the power-management mechanism in the first portable electronic device, a second power state of a second power source in the second portable electronic device; and
   via the power-management mechanism, separately adjust based on the first and second power states,
      a power consumption of circuits in the first portable electronic device,
      a power consumption of circuits in the second portable electronic device,
      a power received by the first portable electronic device from the second portable electronic device, and
      a power sent from the first portable electronic device to the second portable electronic device.

2. The portable electronic device of claim 1, wherein the power-management mechanism approximately synchronizes power consumption of the first and second portable electronic devices.

3. The portable electronic device of claim 2, wherein the approximate synchronization facilitates concurrent operation of the first and second portable electronic devices.

4. The portable electronic device of claim 1, wherein the first power state includes available power from the first power source and the second power state includes available power from the second power source.

5. The portable electronic device of claim 4, wherein the power-management mechanism approximately synchronizes the first and second power state.

6. The portable electronic device of claim 1, wherein the power-management mechanism determines the second power state based on an electrical signal provided by a second power-management mechanism in the second portable electronic device, which is conveyed via the interface circuit.

7. The portable electronic device of claim 1, wherein the power-management mechanism determines the second power state by communicating, via the interface circuit, a power-state query to the second portable electronic device and receiving, via the interface circuit, an answer to the power-state query from the second portable electronic device.

8. The portable electronic device of claim 1, wherein the interface circuit is configured to provide power to the second portable electronic device from the portable electronic device; and
   wherein the power-management mechanism is configured to provide the power to the second portable electronic device based on the first and second power states.

9. The portable electronic device of claim 1, wherein the power-management mechanism is configured to determine a second power consumption of second circuits in the second portable electronic device and to adjust the second power consumption by the second circuits based on the first and second power states.

10. A first portable electronic device, comprising:
    a first power source configured to supply power to circuits in the first portable electronic device;
    an interface circuit configured to communicate with and receive power from a second portable electronic device; and
    control logic configured to:
    monitor a first power state of the first power source;
    manage power consumption by the circuits in the first portable electronic device;
    determine, via a power-management mechanism in the first portable electronic device, a second power state of a second power source in the second portable electronic device; and
    via the power-management mechanism, separately adjust based on the first and second power states,
       a power consumption of circuits in the first portable electronic device,
       a power consumption of circuits in the second portable electronic device,
       a power received by the first portable electronic device from the second portable electronic device, and
       a power sent from the first portable electronic device to the second portable electronic device.

11. The portable electronic device of claim 10, wherein the control logic approximately synchronizes power consumption of the first and second portable electronic devices.

12. The portable electronic device of claim 10, wherein the first power state includes available power from the first power source and the second power state includes available power from the second power source.

13. The portable electronic device of claim 12, wherein the control logic approximately synchronizes the first and second power states.

14. The portable electronic device of claim 10, wherein the interface circuit is configured to provide power to the second portable electronic device from the first portable electronic device; and
wherein the control logic is configured to provide the power to the second portable electronic device based on the first and second power states.

15. The portable electronic device of claim 10, wherein the control logic is configured to determine a second power consumption of second circuits in the second portable electronic device and to adjust the second power consumption by the second circuits based on the first and second power states.

16. A first portable electronic device, comprising:
a first power source configured to supply power to circuits in the first portable electronic device;
an interface circuit configured to communicate with and receive power from a second portable electronic device;
a processor;
memory; and
a program module, wherein the program module is stored in the memory and configurable to be executed by the processor to perform power management operations, the program module including:
instructions for monitoring a first power state of the first power source;
instructions for managing power consumption by the circuits in the first portable electronic device;
instructions for determining, via a power-management mechanism in the first portable electronic device, a second power state of a second power source in a second portable electronic device that provides power to the first portable electronic device via an interface circuit; and
instructions for separately adjusting based on the first and second power states and via the power-management mechanism,
a power consumption of circuits in the first portable electronic device,
a power consumption of circuits in the second portable electronic device,
a power received by the first portable electronic device from the second portable electronic device, and
a power sent from the first portable electronic device to the second portable electronic device.

17. The portable electronic device of claim 16, wherein the adjusting approximately synchronizes power consumption of the first and second portable electronic devices.

18. The portable electronic device of claim 16, wherein the first power state includes available power from the first power source and the second power state includes available power from the second power source.

19. The portable electronic device of claim 18, wherein the adjusting approximately synchronizes the first and second power states.

20. The portable electronic device of claim 16, wherein the interface circuit provides power to the second portable electronic device from the first portable electronic device; and
wherein the program module includes instructions for providing the power to the second portable electronic device based on the power state and the second power state.

21. The portable electronic device of claim 16, wherein the program module includes instructions for determining a second power consumption of second circuits in the second portable electronic device and to adjust the second power consumption by the second circuits based on the power state and the second power state.

22. A computer-program product for use in conjunction with a first portable electronic device, the computer-program product comprising a non-transitory computer-readable storage medium and a computer-program mechanism embedded therein, to perform power management, the computer-program mechanism including:
instructions for monitoring a first power state of a first power source in the first portable electronic device that supplies power to circuits in the first portable electronic device;
instructions for managing power consumption by the circuits in the first portable electronic device;
instructions for determining, via a power-management mechanism in the first portable electronic device, a second power state of a second power source in a second portable electronic device that provides power to the first portable electronic device via an interface circuit; and
instructions for separately adjusting based on the first and second power states and via the power-management mechanism,
a power consumption of circuits in the first portable electronic device,
a power consumption of circuits in the second portable electronic device,
a power received by the first portable electronic device from the second portable electronic device, and
a power sent from the first portable electronic device to the second portable electronic device.

23. A method for performing power management, the method comprising:
monitoring a first power state of a first power source in a first portable electronic device that supplies power to circuits in the first portable electronic device;
managing power consumption by the circuits in the first portable electronic device;
determining, via a power-management mechanism in the first portable electronic device, a second power state of a second power source in a second portable electronic device that provides power to the first portable electronic device via an interface circuit; and
separately adjusting, via the power-management mechanism and based on the first and second power states,
a power consumption of circuits in the first portable electronic device,
a power consumption of circuits in the second portable electronic device,
a power received by the first portable electronic device from the second portable electronic device, and
a power sent from the first portable electronic device to the second portable electronic device.

* * * * *